United States Patent
Freeman et al.

(10) Patent No.: US 7,562,144 B2
(45) Date of Patent: Jul. 14, 2009

(54) DYNAMIC DETERMINATION OF MASTER SERVERS FOR BRANCHES IN DISTRIBUTED DIRECTORIES

(75) Inventors: David S. Freeman, Austin, TX (US); Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 11/470,502

(22) Filed: Sep. 6, 2006

(65) Prior Publication Data

US 2008/0059629 A1 Mar. 6, 2008

(51) Int. Cl.
*G06F 15/173* (2006.01)

(52) U.S. Cl. ............... 709/226; 709/224; 709/220; 709/221

(58) Field of Classification Search ............ 709/226, 709/224, 220, 221, 216, 217, 218, 219, 222, 709/203; 707/3, 511, 9; 718/100
See application file for complete search history.

(56) References Cited

U.S. PATENT DOCUMENTS

| | | | |
|---|---|---|---|
| 6,070,191 A * | 5/2000 | Narendran et al. | 709/226 |
| 6,104,871 A * | 8/2000 | Badovinatz et al. | 718/100 |
| 6,606,643 B1 * | 8/2003 | Emens et al. | 709/203 |
| 6,647,408 B1 | 11/2003 | Ricart et al. | |
| 6,708,170 B1 * | 3/2004 | Byrne et al. | 707/9 |
| 6,772,333 B1 | 8/2004 | Brendel | |
| 2002/0065848 A1 * | 5/2002 | Walker et al. | 707/511 |
| 2003/0069974 A1 | 4/2003 | Lu et al. | |
| 2004/0215600 A1 * | 10/2004 | Aridor et al. | 707/3 |
| 2005/0063005 A1 | 3/2005 | Phillips et al. | |
| 2005/0198238 A1 * | 9/2005 | Sim et al. | 709/222 |
| 2005/0203993 A1 | 9/2005 | Grobman et al. | |
| 2007/0260732 A1 * | 11/2007 | Koretz | 709/226 |
| 2008/0046558 A1 * | 2/2008 | Raja et al. | 709/224 |

* cited by examiner

*Primary Examiner*—Le Luu
(74) *Attorney, Agent, or Firm*—Dillon & Yudell LLP (57) ABSTRACT

Dynamically modifying the allocation of branches of a directory information tree to directory servers, based on the real time volume of requests processed for a specific branch at a particular directory server. In particular, a Master Server (MS) utility calculates and stores branch access numbers for each server in the form of decaying averages. The MS utility maintains these access numbers within a database table. The MS utility determines if branches are transferred to a new master server by evaluating these access numbers within pre-set transfer criteria, which include a set of Boolean conditions. That is, transferring a branch to a new master server is dependent on the branch access numbers of the prospective master server candidate satisfying a set of Boolean conditions. Once the MS utility determines that these Boolean conditions are satisfied, the MS utility transfers the branch to that new master server.

18 Claims, 4 Drawing Sheets

| Branch | New York | | Los Angeles | |
|---|---|---|---|---|
| | DA | time | DA | time |
| ou = mktg, o = sample | 234 | 11:12 | 2305 | 11:14 |
| ou = admin, o = sample | 1234 | 10:15 | 12 | 10:02 |

DYNAMIC DETERMINATION OF MASTER SERVERS FOR BRANCHES IN DISTRIBUTED DIRECTORIES

BACKGROUND OF THE INVENTION

1. Technical Field

The present invention generally relates to computer network systems and in particular to directory servers in computer network systems. Still more particularly, the present invention relates to the determination of master directory servers in computer network systems.

2. Description of the Related Art

Conventional directory servers allow different servers to manage different branches of a directory tree. However, the allocation of branches to servers is a static or manual decision. This means that an implementer needs to make a conscious choice about which server will control particular branches. If a particular branch is accessed more by users on a server which does not control that branch, additional time is required to forward the users' requests to the appropriate server compared to the time taken to fulfill requests for branches the server actually controls.

The additional time consumed forwarding numerous requests to another server results in inefficiencies with the current method of static or manual allocation of a master server. Unfortunately, the server that controls particular branches at implementation remains in control of these branches indefinitely or until an implementer makes a manual change of the branch-master server allocation. Considering the inefficiencies in the system of manually designating master servers, the present invention appreciates that a solution which places branches under the control of the server at which they are requested most would increase the efficiency of the system of server directories.

SUMMARY OF THE INVENTION

Disclosed is a method, system, and computer program product to dynamically modify the allocation of branches of a directory information tree to master directory servers, based on the real time volume of requests processed for a specific branch at a particular directory server. In particular, a Master Server (MS) utility calculates and stores branch access numbers for each server in the form of decaying averages. The MS utility maintains these access numbers as separate Lightweight Directory Access Protocol (LDAP) objects inside the branch or within a database table. The MS utility also determines if branches are transferred to a new master server by evaluating these access numbers within pre-set transfer criteria, which include a set of Boolean conditions. That is, transferring a branch to a new master server is dependent on the branch access numbers of the prospective master server candidate satisfying a set of Boolean conditions. Once the MS utility determines that these Boolean conditions are satisfied, the MS utility transfers the branch to that new master server.

In one embodiment, the branch transfer is completed as follows: (1) the MS utility locks the branch for writes; (2) the MS utility transfers the branch to the new master; and (3) the MS utility makes the branch writeable again. Ultimately, the MS utility provides faster and more efficient access to information by placing branch information on the server at which the information is most requested.

The above as well as additional objectives, features, and advantages of the present invention will become apparent in the following detailed written description.

BRIEF DESCRIPTION OF THE DRAWING

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product to dynamically modify the allocation of branches of a directory information tree to master directory servers, based on the real time volume of requests processed for a specific branch at a particular directory server. In particular, a Master Server (MS) utility calculates and stores branch access numbers for each server in the form of decaying averages. The MS utility maintains these access numbers as separate Lightweight Directory Access Protocol (LDAP) objects inside the branch or within a database table. The MS utility also determines if branches are transferred to a new master server by evaluating these access numbers within pre-set transfer criteria, which include a set of Boolean conditions. That is, transferring a branch to a new master server is dependent on the branch access numbers of the prospective master server candidate satisfying a set of Boolean conditions. Once the MS utility determines that these Boolean conditions are satisfied, the MS utility transfers the branch to that new master server.

In one embodiment, the branch transfer is completed as follows: (1) the MS utility locks the branch for writes; (2) the MS utility transfers the branch to the new master; and (3) the MS utility makes the branch writeable again. Ultimately, the MS utility provides faster and more efficient access to information by placing branch information on the server at which the information is most requested.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

Figure 2:
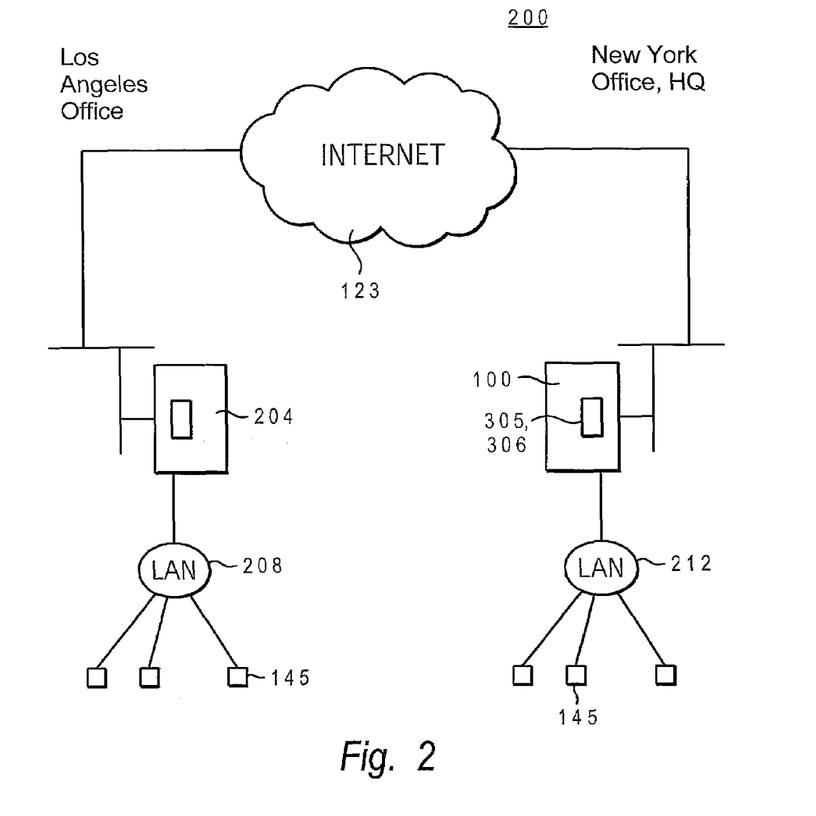
FIG. 2 is a block diagram representation of an example network, according to an illustrative embodiment.

With reference now to the figures, FIG. 2 illustrates an example Directory Server network, within which features of the invention may be practiced. Example Network 200 illustrates how requests are handled in a network consisting of two separate offices, each having its own directory server. A directory server is a server designed to manage large directories of users and resources. When a directory server gets a request for a branch that the directory server controls, that server provides branch access to the user making the request. When the (directory) server gets a read request for a branch that the server does not control, the server either responds from a cache or forwards the request to the appropriate next server. When a server gets a write request for a branch the server does not control, the server always forwards the request to the appropriate next server.

Figure 1:
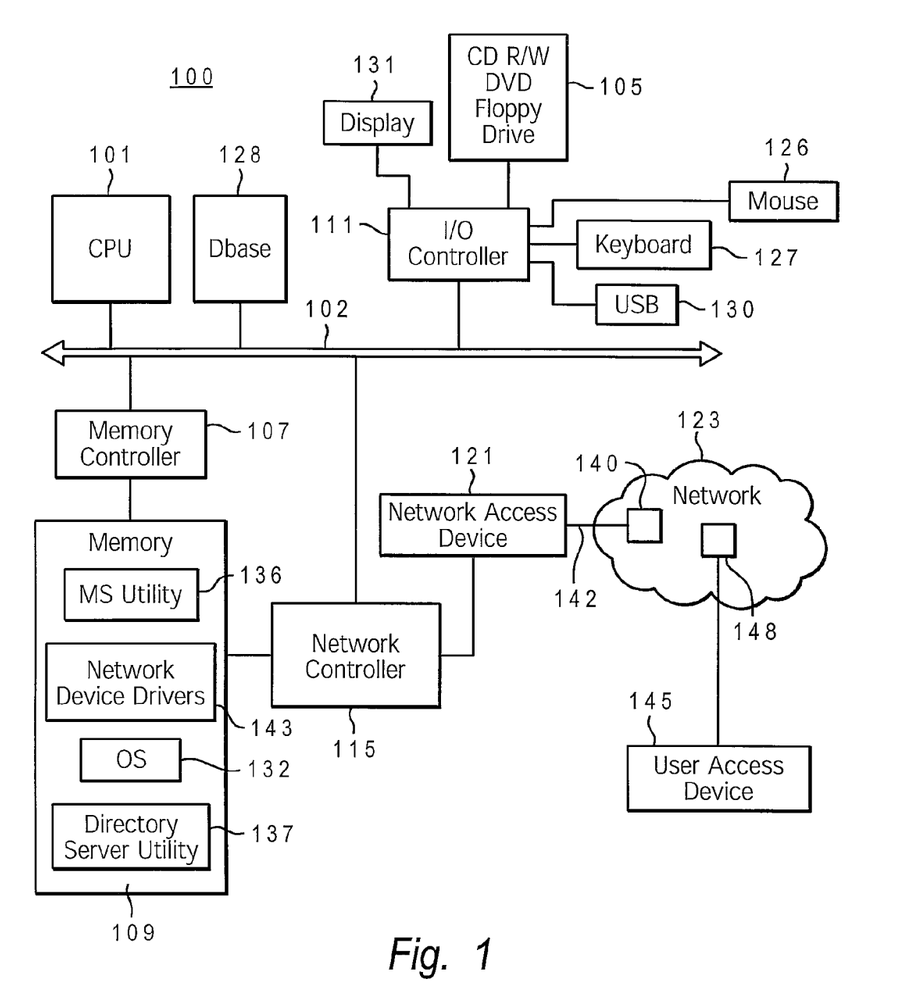
FIG. 1 is a block diagram of a data processing system within which the features of an illustrative embodiment may be advantageously implemented.

Network 200 consists of Los Angeles (LA) Directory server 204 and New York (NY) Directory server 100 (FIG. 1). In the New York office, LAN 208 is connected to NY server 100. In the Los Angeles office, LAN 212 is connected to LA server 204. Users in the New York office access NY directory server 100 via user access device (UAD) 145 connected to LAN 212. Similarly users in the LA office access LA directory server 204 via user access device (UAD) 145 connected to LAN 208. NY server 100 and LA server 204 are able to communicate with each other using Network 123. NY server 100 initially controls both admin branch 305 and mktg branch 306 (FIG. 3), i.e., as master server for both branches. However, as described in details below, LA server 204 may also be utilized to access both branches, and initially accesses both branches via NY server 100.

In network 200, requests from users in the New York office are always directed to NY server 100. Requests from users in the Los Angeles office are always directed to LA server 204. When NY server 100 receives a request for a branch (for example, admin branch 305 or mktg branch 306) which NY server 100 controls, NY server 100 grants access to the branch. When LA server 204 gets a read request for a branch (for example, admin branch 305 or mktg branch 306) which LA server 204 does not control, LA server 204 either responds from a cache or forwards the request to the appropriate server (which controls the branch). The appropriate server may be NY server 100 or a proxy server for NY server 100. When LA server 204 gets a write request from a user via UAD 145 for a branch LA server 204 does not control, LA server 204 always forwards the request to the appropriate server.

Turning now to FIG. 1, wherein is illustrated an example data processing system, which may be utilized as either one of NY directory server 100 or LA directory server 204, in accordance with an embodiment of the invention. For consistency within the description of the invention, data processing system is assumed to represent either one of these directory servers and is hereinafter referred to as a general "directory server" 100.

Directory server 100 comprises central processing unit (CPU) 101 coupled to system bus/interconnect 102. Also coupled to system bus/interconnect 102 is memory controller 107 which controls access to memory 109. Database 128 is also coupled to system bus/interconnect 128. System bus 102 is coupled to input/output controller (I/O Controller) 111, which controls access to/from several input devices, of which mouse 126 and keyboard 127 are illustrated. I/O Controller 111 also controls access to output devices, of which display 131 is illustrated. In order to support use of removable storage media, I/O Controller 111 may further support one or more USB ports 130 and one or more drives 105 for media, such as compact disk Read/Write (CDRW), digital video disk (DVD), and Floppy disk, for example.

Directory server 100 further comprises network access device 121 by which directory server 100 is able to connect to and communicate with an external device or network (such as the Internet or network 123) via wired or wireless connection 142. Network access device 121 may be a modem or network adapter and may also be a wireless transceiver device. Directory server 100 is able to connect to and communicate with user access device 145 via network 123 or with other external devices (e.g., other directory servers) via a wide area network, such as the Internet.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The directory server (data processing system) depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within memory 109 or other storage and executed by processor(s) 101. Among the software code are code for providing directory server functionality, code for enabling network connection and communication via Network Access Device (NAD) 121, and more specific to the invention, code for enabling the master server determination features described below. For simplicity, the collective body of code that enables the master-server determination features is referred to herein as the MS utility. In actual implementation, the MS utility may be added to existing directory server code to provide the master-server, branch allocation functionality described herein.

Thus, as shown by FIG. 1, in addition to the above described hardware components, directory server 100 further comprises a number of software components, including operating system (OS) 132 (e.g., Microsoft Windows®, a trademark of Microsoft Corp, or GNU®/Linux®, registered trademarks of the Free Software Foundation and The Linux Mark Institute) and one or more software applications, including directory server utility 137 and MS utility 136. In implementation, OS 132, directory server utility 137, and MS utility 136 are located within memory 109 and executed on processor (CPU) 101. According to the illustrative embodiment, when processor 101 executes MS utility 136 along with directory server utility 137, MS utility 136 enables directory server 100 to complete a series of functional processes, including: (1) tracking user requests for branches across the directory tree; (2) calculating and updating access numbers for the branches in the form of decaying averages; (3) determining if a master server change for a particular branch is necessary; (4) dynamically transferring branches to new master servers; and other features/functionality described herein and illustrated by FIGS. 2-5.

According to the illustrative embodiment of the invention, upon servicing of the request, Master Server (MS) utility 136

(FIG. 1) updates access numbers in the form of decaying averages (DA), according to equations A and B described below. MS utility 136 calculates and stores branch DA access numbers for each server.

A decaying average is a weighted average which factors specific events more heavily than others, for example, recent events may carry more weight than more aged events. With respect to the described embodiment, MS utility 136 utilizes an exponentially decaying average to reward higher access numbers to server locations exhibiting a recent trend of originating requests for a particular branch. The exponential component comprises a base (B) and a time interval exponent (T), to which the base is raised (e.g., $B^T$). The base value is responsible for the amount by which access numbers get discounted as time passes. In other words, the base value is responsible for the decay rate. In the described embodiment, the base value is represented by a constant B which is a value less than 1. The decay rate is measured by the difference in values between 1 and the base value. The exponent is a variable which represents some interval of time. In the described embodiment, the exponent is a measure of the time interval between the present system time and the last time a particular server originated a request to that same branch location. B raised to a particular exponent becomes smaller as the time interval exponent (T) becomes larger. Thus, if a large time interval exists between the present time and the last time a particular server originated a request to that same branch location, the access number of that particular server to that branch suffers (i.e., becomes smaller).

Figure 3:
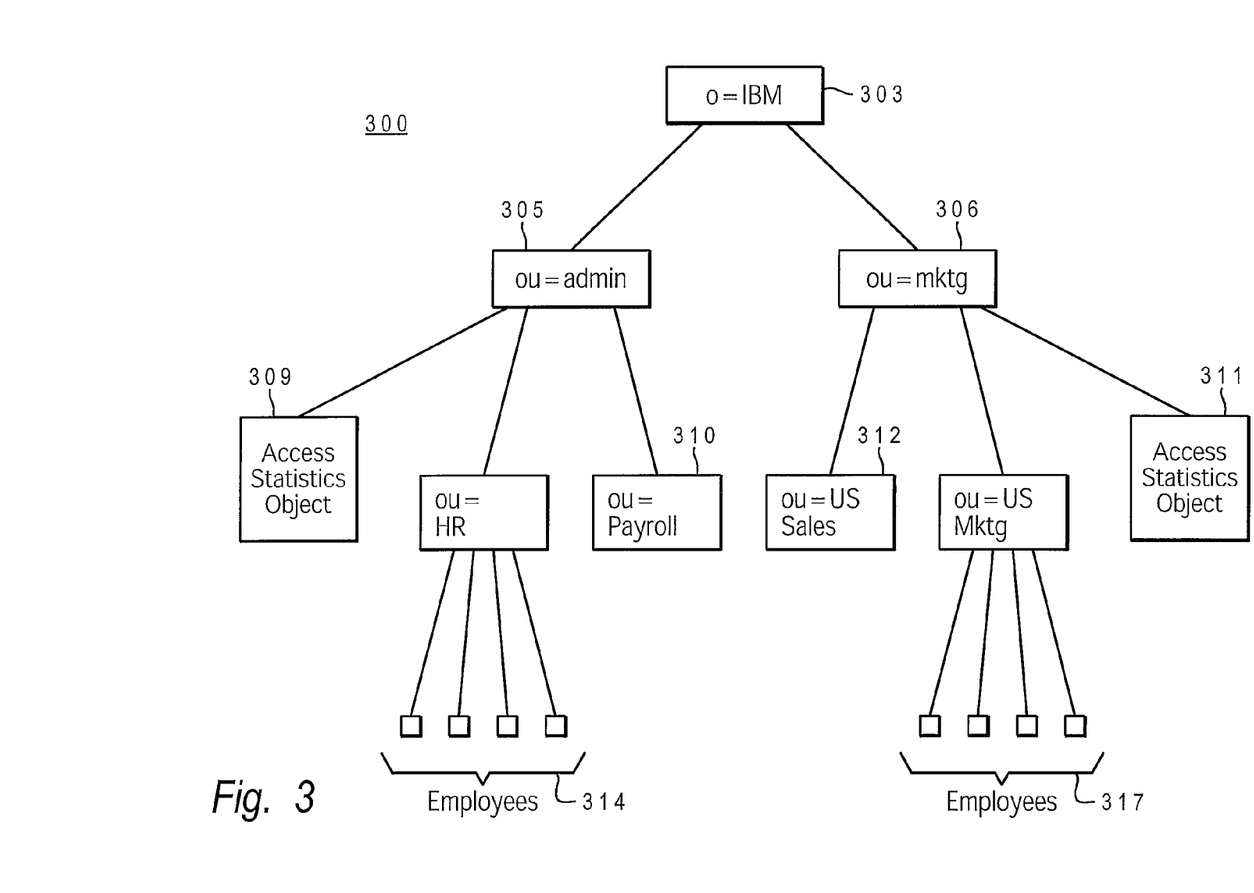
FIG. 3 is a block diagram representation of a Directory Information Tree (DIT) for an example organization, according to an illustrative embodiment.

When applied to the example directory tree system of FIG. 2, upon the servicing of a user's request, MS utility 136 updates DA access numbers (as described below). MS utility 136 evaluates Boolean conditions (Equations 1 and 2 described below) to determine if a master server change for either admin branch 305 or mktg branch 306 from NY server 100 to LA server 204 is necessary. If master server change is not needed for any branch, MS utility 136 allows the current master server (NY server 100) of admin branch 305 and mktg branch 306 to maintain its master server status. However, if the Boolean conditions for a change of master server are satisfied, MS utility 136 locks the branch being transferred for writes, and transfers the branch. Once MS utility 136 transfers the branch to the new master server, MS utility 136 then makes the branch writeable again.

In the described embodiment, MS utility 136 utilizes the following parameters: (1) B: a constant, slightly below one (for example, 0.9999). MS utility 136 uses this constant to determine how fast the decaying average decays; (2) DA_Min: the minimum value (for the decaying average) at which MS utility 136 transfers a branch to a new server location. A branch will only be transferred if the access number is at least DA_Min. MS utility 136 uses DA_Min to avoid having a rarely used branch transfer every time the branch is accessed; (3) DA_Ratio: the minimum value of DA at future server location/DA at current server location at/above which MS utility 136 transfers a branch; (4) req_server_DA: the access number of the server that originates the last request; (5) current master_DA: the access number of the current master server; (6) server_DA: the access number of servers that did not originate the last request ("other servers"); (7) now—req_server_time: elapsed time from the moment that the last request was received by the originating server until the present time; and (8) now—server_time: time interval between the present time and the last time that the other server(s) last requested that branch location.

Whenever an entry in a branch is read or written, MS utility 136 updates the table of branch access numbers. This table may be stored in database 128. For the server that originated the request, MS utility 136 sets the access number to:

$$\text{req\_server\_}DA = \text{req\_server\_}DA * B^{(now-req\_server\_time)} + 1 \quad (A)$$

For every other server, MS utility 136 sets the access number to:

$$\text{server\_}DA = \text{server\_}DA * B^{(now-server\_time)} \quad (B)$$

Following, to determine when control of a branch is to be re-allocated to a new master server, MS utility 136 checks whether the following two Boolean conditions hold (i.e., are resolved as "true"):

$$\text{req\_server\_}DA >= DA\_\text{MIN; and} \quad (1)$$

$$\text{req\_server\_}DA/\text{current master\_}DA > DA\_\text{Ratio.} \quad (2)$$

The second bolean equation provides a comparative DA value of DA_Ratio. When, both Boolean conditions resolve as true, MS utility 136 implements the transfer of the branch to the new master server. In completing this transfer, in one embodiment, MS utility 136 locks the branch for writes (i.e., temporarily prevents all write access to the branch), transfers the branch to the new master server, and then makes the branch writable again.

Turning now to FIG. 3, which depicts a block diagram representation of Directory Information Tree (DIT) for an example organization. DIT is an organized way to provide containers for storing different types of information. It may be thought of as a filing system for data. In the described embodiment, information in a directory is stored in a tree form. Branches in the tree may represent locations, organization units, etc. Each branch may be assigned to a particular master server within a directory server network (FIG. 2). Each branch is accessible by users via servers on the directory server network. Each server is a data processing system like directory server 100 which has an MS utility (FIG. 1).

Figure 4:
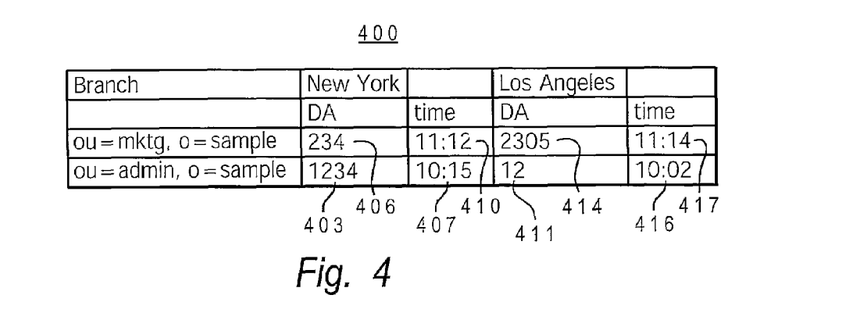
FIG. 4 is a table showing the decaying average (DA) access numbers of the different branches of a sample organization directory, according to an illustrative embodiment.
Figure 5:
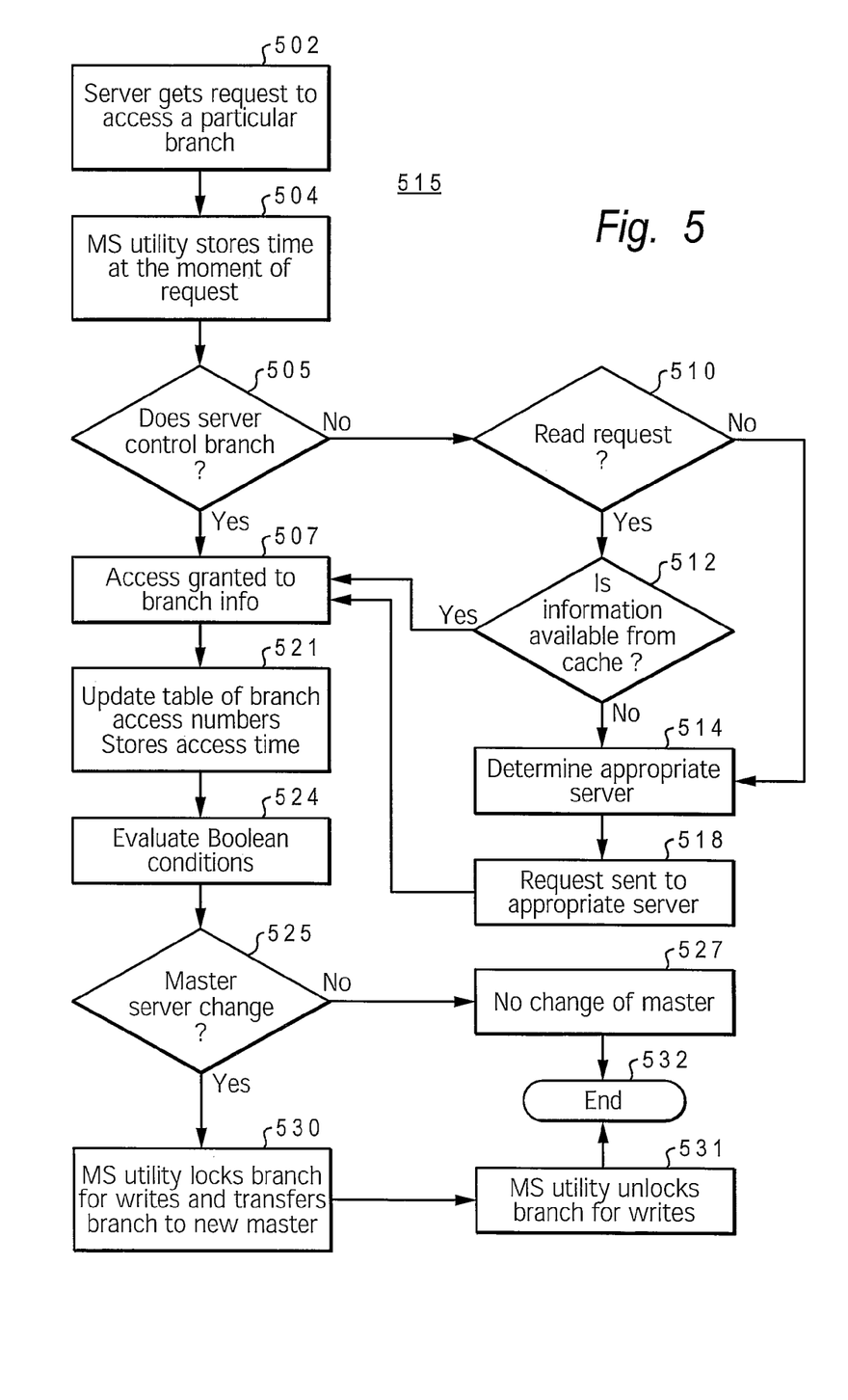
FIG. 5 illustrates the process completed by a directory server request system when executing the master server (MS) utility, according to an illustrative embodiment.

In FIG. 3, an example organization is represented in the form "o=IBM", where o means organization. Similarly, each branch is of the form ou=<name>, where ou means organizational unit. The FIG. 3 example shows a directory for IBM organization 303 comprising administration (admin) branch 305 and marketing (mktg) branch 306. NY server 100 initially controls both admin branch 305 and mktg branch 306, i.e., as master server for both branches. Admin branch 305 comprises both departments, Payroll 310 and HR 314, and object 309 which stores corresponding access statistics. Mktg branch 306 comprises both departments US Sales 312 and US Mktg 317 and object 311 which also stores corresponding access statistics. According to the described embodiment, object 309 and object 311 are database tables, which store corresponding access statistics. In an alternate embodiment, object 309 and object 311 may be Lightweight Directory Access Protocol (LDAP) objects. When users access the information in admin branch 305 and mktg branch 306, MS utility 136 updates access numbers in object 309 and object 311, respectively. MS utility 104 tracks users' branch requests and time and frequency of the requests and applies the tracked statistics within specific calculations to produce a table of access statistics, for example, table 400 (FIG. 4). MS utility 104 operates according to the process described below and illustrated by the flow chart (FIG. 5).

FIG. 4 is a table showing a snapshot of the access numbers of the different branches of the directory of IBM organization 303. NY server 100 initially controls both admin branch 305 and mktg branch 306 (FIG. 3), i.e., as master server for both branches. In the described embodiment, MS utility 136 updates and stores DA access numbers in database tables, for example object 309 and object 311. For admin branch 305, DA access number 403 of NY server 100 is listed as 1234. However, for admin branch 305, DA access number 411 of LA server 204 is listed as 12. For admin branch 305, most recent request time (MRRT) 407 of NY server 100 is listed as 10:15 am. For admin branch 305, MRRT 416 of LA server 204 is listed as 10:02 am. Based on the above disparities in the DA access numbers, it is obvious that NY server 100 is originating most requests for admin branch 305. The numbers presented within FIG. 4 are updated every present time period ("now") based on the two exponential equations, A and B, presented above.

On the other hand, for mktg branch 306, DA access number 406 of NY server 100 is listed as 234. However, for mktg branch 306, DA access number 414 of LA server 204 is listed as 2305. For mktg branch 306, MRRT 410 of LA server 204 is listed as 11:12 am, while MRRT 417 of LA server 204 is listed as 11:14 am. From the table entries, with respect to mktg branch 306, it is apparent that the access number for LA server 204 is significantly larger than the access number for NY server 100, the current branch master server. Based on the above disparities in the DA access numbers, it is obvious that LA server 204 is originating most requests for mktg branch 306. In order to determine if mktg branch 306 is to be transferred to the control of LA server 204 from NY server 100, MS utility 136 evaluates the Boolean conditions, provided above, according to the described embodiments.

With respect to FIG. 4, in order to determine if a change of master server is necessary, MS utility 136 requires the values of the DA_Ratio parameter and DA_Min parameter (to make a definitive decision). Assuming a DA_Ratio value of 1.5 and a DA_min value of 250, MS utility 136 would evaluate the Boolean conditions as follows:

(a) Boolean condition 1 holds (equates as true) since DA access number 414 of LA server 204 which is 2305 is larger than 250, the DA_min value;

(b) Boolean condition 2 also holds because 2305 (which is DA access number 414 of LA server 204) divided by 234 (which is DA access number 406 of NY server 100) is larger than 1.5 (DA_Ratio).

With the above resolution of both Boolean conditions as true, MS utility 136 transfers mktg branch 306 as follows: (1) MS utility 136 locks mktg branch 306 for writes; (2) MS utility 136 transfers mktg branch 306 to LA server 204, the new master server for mktg branch 306; and (3) MS utility 136 makes mktg branch 306 writeable again.

FIG. 5 illustrates the process completed by a directory server request system when executing MS utility 136, according to the described embodiment. The process begins at block 502, at which a server receives a request to access a particular branch of a directory. Once a request is received, MS utility 136 stores the time at which the request is received, at block 504. Server determines if the server itself is in control of the directory branch, as shown at block 505. If the server that received the request is in control of the branch to which access is requested, access is granted to the branch, at block 507. However, if the server that received the request does not control the branch to which access is requested, server determines what type of request was issued. In particular, the server determines if a read request or a write request was received, as shown at block 510. If a read request was received, the server checks, at block 512, whether the information is available from cache, which provides quick access to frequently used information. If a read request was received and the information is available from cache, access is granted to the branch information, as shown at block 507.

If a read request was received and the information is not available in cache, the server determines which server is the appropriate next server, at block 514, and the server forwards the request to the appropriate next server, as shown at block 518. If a write request was received by the server for a branch the server does not control, the process also advances to block 514, at which the server determines which server is the appropriate next (master) server, and the server forwards the request to the appropriate next server, as shown at block 518. After the request is forwarded to the appropriate next server, access to the branch is provided, as shown at block 507. Once access is granted to a branch, MS utility 136 stores the time of branch access and updates the table of branch access statistics (according to equations A and B above), at block 521. MS utility 136 then evaluates the Boolean conditions (Equations 1 and 2 described above), at block 524, to determine if a master server change is necessary, as shown at block 525. If a master server change is not needed, MS utility 136 allows the current master server to maintain its master server status, as shown at block 527. However, at block 530, if the Boolean conditions for a change of master server are satisfied, MS utility 136 completes the transfer of the branch to the new master server, as shown at block 531. Specifically, MS utility 136 locks the branch being transferred for writes, and transfers the branch to the new master server. Once MS utility 104 transfers the branch to the new master server, MS utility 104 then makes the branch writeable again. The process ends at block 532.

In the flow chart (FIG. 5) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a directory server environment with multiple servers, a method comprising:

responsive to receipt of a request for processing by the processor at a first server for access to a specific branch of a directory tree having branches of information that are (a) stored at specific master servers among the multiple servers and (b) individually accessible by requests at any one of the multiple servers, determining if the first server is a master server for that specific branch;

comparing a frequency of access to the specific branch originating from the first server against pre-established threshold values, wherein said threshold values are established to trigger a master-server change for the specific branch based on the frequency of access to that specific branch requested at the first server relative to the other servers of the multiple servers; and when the threshold values are met, dynamically assigning the first server as a new master server for that specific branch; and automatically transferring the specific branch to the first server, which becomes the new master server for the specific branch.

2. The method of claim 1, wherein:

when the first server receiving the request is the master-server, directly providing the branch in response to the first request;

when the first server is not the master-server but contains a locally cached copy of the specific branch:
 providing the branch from the local cache of the first server when the request is a read request;
 when the request is a write request:
  forwarding the request to the master server of that specific branch to generate an updated version of the specific branch; and
  replacing the locally cached copy of the specific branch with the updated version of the specific branch;

when the first server is not the master-server and does not contain a locally cached copy of the specific branch:
 retrieving the branch from the master-server for the specific branch among the multiple servers;
 storing a local copy of the branch in the local cache;
 providing the branch in response to the request; and automatically updating a decaying average parameter at the first server and at each other server of the multiple servers following completion of the request, wherein the decaying average parameter enables determination of the master-server assignment and re-assignment for the specific branch.

3. The method of claim 2, wherein said automatically updating comprises:

calculating an access number for each server in the form of a decaying average (DA); and storing the DA access numbers for the specific branch at each of the multiple servers;

wherein the decaying average is a weighted average which factors specific events such that a recent request for the specific branch is afforded greater weight than a less recent request;

wherein said DA is an exponentially decaying average that rewards higher access numbers to servers exhibiting a recent trend of originating requests for the specific branch; and wherein said DA comprises (1) a base component that has a value less than 1 and provides a decay rate at which access numbers are discounted as time passes and (2) an exponent component with a variable, time-measured value, wherein the time-measured value is a measure of a time interval between a present system time and a last time a particular server among the multiple servers originated a request for the specific branch.

4. The method of claim 3, further comprising:

dividing a value of DA for each server by a next value of DA at the master-server to yield a comparative DA value;

evaluating two bolean equations following each request for the specific branch to determine when the first server should be made the new-master server of the specific branch, said evaluating including:

comparing the DA of the first server and each other server of the multiple servers with a first pre-established constant, DA_Min, which is a minimum value of DA that triggers the transfer of the specific branch to a new master-server, wherein when the first server is not the master-server of the specific branch, the specific branch is only transferred to the first server if the access number of the specific branch at the first server is at least DA_Min; and comparing the comparative DA value to a second pre-established constant, DA_Ratio, wherein when the first server is not the master-server of the specific branch, the specific branch is only transferred to the first server if the comparative DA value of the specific branch at the first server is at least DA_Ratio.

5. The method of claim 1, further comprising:

when an entry in the specific branch is accessed for either a read or write, automatically updating branch access numbers for each server among the multiple servers, wherein said automatically updating comprises:

periodically updating the first server's DA based on a first equation which comprises:

$$\text{req\_server}_{13\ DA=req\_}\text{server}_{13\ DA*B}^{(now\text{-}req\_server\_time)} + 1,$$

wherein "req_server" is the server from which the request originates and "now-req_server_time" represents elapsed time from the moment that the last request for the specific branch was received by the first server until the present system time; and for each other server among the multiple servers, updating the other servers DA based on a second equation which comprises:

$$\text{server\_DA} = \text{server\_DA} * B^{(now\text{-}server\_time)},$$

wherein "now-server_time" is the time interval between the present time and the respective last time that each of the other servers last requested that specific branch.

6. The method of claim 1, wherein when the specific branch is being assigned to a new master-server, said method comprises:

locking the branch from write operations, wherein write access to the specific branch is temporarily prevented;

transferring the branch to the new master-server; and unlocking the branch to enable write access.

7. A computer program product comprising:

a computer readable storage medium; and program code on said computer readable storage medium that when executed by a processor of a server within a directory server environment with multiple servers, provides a series of functional processes comprising:

responsive to receipt of a request at a first server for access to a specific branch of a directory tree having branches of information that are (a) stored at specific master servers among the multiple servers and (b) individually accessible by requests at any one of the multiple servers, determining if the first server is a master server for that specific branch;

comparing a frequency of access to the specific branch originating from the first server against pre-established threshold values, wherein said threshold values are established to trigger a master-server change for the specific branch based on the frequency of access to that specific branch requested at the first server relative to the other servers of the multiple servers; and when the threshold values are met, dynamically assigning the first server as a new master server for that specific branch; and
automatically transferring the specific branch to the first server, which becomes the new master server for the specific branch.

8. The computer program product of claim 7, wherein said program code further comprise code for:
when the first server receiving the request is the master-server, directly providing the branch in response to the first request;
when the first server is not the master-server but contains a locally cached copy of the specific branch:
providing the branch from the local cache of the first server when the request is a read request;
when the request is a write request:
forwarding the request to the master server of that specific branch to generate an updated version of the specific branch; and
replacing the locally cached copy of the specific branch with the updated version of the specific branch;
when the first server is not the master-server and does not contain a locally cached copy of the specific branch:
retrieving the branch from the master-server for the specific branch among the multiple servers;
storing a local copy of the branch in the local cache;
providing the branch in response to the request; and
automatically updating a decaying average parameter at the first server and at each other server of the multiple servers following completion of the request, wherein the decaying average parameter enables determination of the master-server assignment and re-assignment for the specific branch.

9. The computer program product of claim 8, wherein said program code for automatically updating comprises code for:
calculating an access number for each server in the form of a decaying average (DA); and
storing the DA access numbers for the specific branch at each of the multiple servers;
wherein the decaying average is a weighted average which factors specific events such that a recent request for the specific branch is afforded greater weight than a less recent request;
wherein said DA is an exponentially decaying average that rewards higher access numbers to servers exhibiting a recent trend of originating requests for the specific branch; and
wherein said DA comprises (1) a base component that has a value less than 1 and provides a decay rate at which access numbers are discounted as time passes and (2) an exponent component with a variable, time-measured value, wherein the time-measured value is a measure of a time interval between a present system time and a last time a particular server among the multiple servers originated a request for the specific branch.

10. The computer program product of claim 9, further comprising program code for:
dividing a value of DA for each server by a next value of DA at the master-server to yield a comparative DA value;
evaluating two bolean equations following each request for the specific branch to determine when the first server should be made the new-master server of the specific branch, said evaluating including:
comparing the DA of the first server and each other server of the multiple servers with a first pre-established constant, DA_Min, which is a minimum value of DA that triggers the transfer of the specific branch to a new master-server, wherein when the first server is not the master-server of the specific branch, the specific branch is only transferred to the first server if the access number of the specific branch at the first server is at least DA_Min; and
comparing the comparative DA value to a second pre-established constant, DA_Ratio, wherein when the first server is not the master-server of the specific branch, the specific branch is only transferred to the first server if the comparative DA value of the specific branch at the first server is at least DA_Ratio.

11. The computer program product of claim 7, further comprising program code for:
when an entry in the specific branch is accessed for either a read or write, automatically updating branch access numbers for each server among the multiple servers, wherein said automatically updating comprises:
periodically updating the first server's DA based on a first equation which comprises:
req_server_DA=req_server_DA*$B^{(now\text{-}req\_server\_time)}$+1, wherein "req_server" is the server from which the request originates and "now-req_server_time" represents elapsed time from the moment that the last request for the specific branch was received by the first server until the present system time; and
for each other server among the multiple servers, updating the other servers DA based on a second equation which comprises:
server_DA=server_DA*$B^{(now\text{-}server\_time)}$ wherein "now-server_time" is the time interval between the present time and the respective last time that each of the other servers last requested that specific branch.

12. The computer program product of claim 7, wherein when the specific branch is being assigned to a new master-server, said program code comprises code for:
locking the branch from write operations, wherein write access to the specific branch is temporarily prevented;
transferring the branch to the new master-server; and
unlocking the branch to enable write access.

13. A computer system operating as a server within a directory server environment with multiple servers, said server comprising:
a processor;
a memory coupled to the processor;
means for connecting to the directory server environment via a network;
program code that when executed by the processor enables a series of functional processes comprising:
responsive to receipt of a request at a first server for access to a specific branch of a directory tree having branches of information that are (a) stored at specific master servers among the multiple servers and (b) individually accessible by requests at any one of the multiple servers, determining if the first server is a master server for that specific branch;
comparing a frequency of access to the specific branch originating from the first server against pre-established threshold values, wherein said threshold values are established to trigger a master-server change for the specific branch based on the frequency of access to that specific branch requested at the first server relative to the other servers of the multiple servers; and
when the threshold values are met, dynamically assigning the first server as a new master server for that specific branch; and automatically transferring the specific branch to the first server, which becomes the new master server for the specific branch.

14. The server of claim 13, wherein said program code further comprise code for:
when the first server receiving the request is the master-server, directly providing the branch in response to the first request;
when the first server is not the master-server but contains a locally cached copy of the specific branch:
providing the branch from the local cache of the first server when the request is a read request;
when the request is a write request:
forwarding the request to the master server of that specific branch to generate an updated version of the specific branch; and
replacing the locally cached copy of the specific branch with the updated version of the specific branch;
when the first server is not the master-server and does not contain a locally cached copy of the specific branch:
retrieving the branch from the master-server for the specific branch among the multiple servers;
storing a local copy of the branch in the local cache;
providing the branch in response to the request; and
automatically updating a decaying average parameter at the first server and at each other server of the multiple servers following completion of the request, wherein the decaying average parameter enables determination of the master-server assignment and re-assignment for the specific branch.

15. The server of claim 14, wherein said program code for automatically updating comprises code for:
calculating an access number for each server in the form of a decaying average (DA); and
storing the DA access numbers for the specific branch at each of the multiple servers;
wherein the decaying average is a weighted average which factors specific events such that a recent request for the specific branch is afforded greater weight than a less recent request;
wherein said DA is an exponentially decaying average that rewards higher access numbers to servers exhibiting a recent trend of originating requests for the specific branch; and
wherein said DA comprises (1) a base component that has a value less than 1 and provides a decay rate at which access numbers are discounted as time passes and (2) an exponent component with a variable, time-measured value, wherein the time-measured value is a measure of a time interval between a present system time and a last time a particular server among the multiple servers originated a request for the specific branch.

16. The server of claim 15, further comprising program code for:
dividing a value of DA for each server by a next value of DA at the master-server to yield a comparative DA value;
evaluating two bolean equations following each request for the specific branch to determine when the first server should be made the new-master server of the specific branch, said evaluating including:
comparing the DA of the first server and each other server of the multiple servers with a first pre-established constant, DA_Min, which is a minimum value of DA that triggers the transfer of the specific branch to a new master-server, wherein when the first server is not the master-server of the specific branch, the specific branch is only transferred to the first server if the access number of the specific branch at the first server is at least DA_Min; and
comparing the comparative DA value to a second pre-established constant, DA_Ratio, wherein when the first server is not the master-server of the specific branch, the specific branch is only transferred to the first server if the comparative DA value of the specific branch at the first server is at least DA_Ratio.

17. The server of claim 13, further comprising program code for:
when an entry in the specific branch is accessed for either a read or write, automatically updating branch access numbers for each server among the multiple servers, wherein said automatically updating comprises:
periodically updating the first server's DA based on a first equation which comprises:
$req\_server\_DA = req\_server\_DA * B^{(now\text{-}req\_server\_time)} + 1$, wherein "req_server" is the server from which the request originates and "now-req_server_time" represents elapsed time from the moment that the last request for the specific branch was received by the first server until the present system time; and
for each other server among the multiple servers, updating the other servers DA based on a second equation which comprises:
$server\_DA = server\_DA * B^{(now\text{-}server\_time)}$, wherein "now-server_time" is the time interval between the present time and the respective last time that each of the other servers last requested that specific branch.

18. The server of claim 13, wherein when the specific branch is being assigned to a new master-server, said program code comprises code for:
locking the branch from write operations, wherein write access to the specific branch is temporarily prevented;
transferring the branch to the new master-server; and
unlocking the branch to enable write access.

* * * * *